US007440880B2

(12) United States Patent
Ikegami et al.

(10) Patent No.: US 7,440,880 B2
(45) Date of Patent: Oct. 21, 2008

(54) DESIGN SUPPORT PROGRAM AND DESIGN SUPPORT METHOD

(75) Inventors: Hideyuki Ikegami, Abiko (JP); Atsushi Chaki, Kashiwa (JP); Satoru Yamamoto, Abiko (JP); Masahiro Serizawa, Toride (JP); Akira Morisawa, Kashiwa (JP)

(73) Assignee: Canon Kabushiki Kaisha (JP)

( * ) Notice: Subject to any disclaimer, the term of this patent is extended or adjusted under 35 U.S.C. 154(b) by 462 days.

(21) Appl. No.: 11/247,071

(22) Filed: Oct. 11, 2005

(65) Prior Publication Data

US 2006/0079980 A1 Apr. 13, 2006

(30) Foreign Application Priority Data

Oct. 12, 2004 (JP) ............................ 2004-297706

(51) Int. Cl.
*G06F 7/48* (2006.01)

(52) U.S. Cl. .......................... 703/6; 700/229; 700/230; 399/16

(58) Field of Classification Search ..................... 703/6; 700/97, 114, 228–230; 399/16, 68
See application file for complete search history.

(56) References Cited

U.S. PATENT DOCUMENTS 6,062,558 A * 5/2000 Takahashi .................. 271/123

FOREIGN PATENT DOCUMENTS

| | | |
|---|---|---|
| JP | 5-143260 A | 6/1993 |
| JP | 6-4234 A | 1/1994 |
| JP | 9-81600 A | 3/1997 |
| JP | 9-309665 A | 12/1997 |
| JP | 2003-54094 A | 2/2003 |
| JP | 2003-242197 A | 8/2003 |

* cited by examiner

*Primary Examiner*—Russell Frejd
(74) *Attorney, Agent, or Firm*—Rossi, Kimms & McDowell LLP

(57) ABSTRACT

A computer readable design support program for inspecting a processing operation of software that controls a sheet conveyance mechanism by displaying the behavior of feeding a virtual sheet from a virtual sheet stock portion on a display portion, includes a sheets number setting procedure of setting the sheets number of virtual sheets stored in the virtual sheet stock portion, a sheet feed display procedure of displaying the behavior of feeding the virtual sheet from the virtual sheet stock portion on the display portion, a stored sheets number subtraction procedure of subtracting the stored sheets number of virtual sheets corresponding to the virtual sheet stock portion to which the virtual sheet is supplied in the sheet feed display procedure, a judgment procedure of judging whether or not the virtual sheet is used up in the virtual sheet stock portion where the stored sheets number of virtual sheets is subtracted in the stored sheets number subtraction procedure, and a paper out display procedure of displaying on the display portion the paper out on the virtual sheet stock portion for which it is judged that the virtual sheet is used up in the judgement procedure.

20 Claims, 18 Drawing Sheets

DESIGN SUPPORT PROGRAM AND DESIGN SUPPORT METHOD

BACKGROUND OF THE INVENTION

1. Field of the Invention

The present invention relates to a design support method and a design support program for supporting the mechanism control design. More particularly, the invention relates to a design support program and a design support method for the software of controlling a conveyance mechanism for conveying a sheet-like carrier.

2. Related Background Art

Conventionally, the conveyance of the sheet-like carrier such as paper (hereinafter simply referred to as paper) is performed in all the fields. For instance, the paper is conveyed by the conveyance mechanism comprising a roller and a guide in the image forming apparatus such as a copier and a printer.

In the conveyance of the paper, in many cases, the paper is rarely conveyed in only one direction simply at an equal velocity. Usually, employing a virtual sensor for detecting the position of the carrier, for example, the paper is stopped at a prescribed position, or reversed in the direction of conveyance by reversely rotating the roller. Accordingly, the software for controlling the mechanism that conveys the paper is indispensable in conveying the paper.

In recent years, it is expressed that the image forming apparatus has higher performance and higher productivity, and correspondingly, the software for controlling the image forming apparatus is complicated, increasing the man-hour required for finding a trouble, specifying the cause, and making correction.

Thus, the chance of using the simulation technology in designing the conveyance mechanism has increased along with the enhanced performance of the computer in recent years. For instance, a system for calculating the action of paper by simulation, and finding the defect potential in the conveyance mechanism has been proposed as disclosed in Japanese Patent Application Laid-Open No. H9-81600.

Moreover, the proposals concerning the inspection of the software for controlling the mechanism have been made while the mechanism simulation is active in all scenes. For the inspection of the software, the reproduction of irregular situations is indispensable, in addition to the simulation of the basic operation of the paper. Because an error in software often occurs during the irregular operation rather than in the basic portion.

In the light of the above respect, a design support method for generating an external event of turning on/off the switch or opening or closing the cover in the printer control software from an input device such as a keyboard has been proposed as disclosed in Japanese Patent Application Laid-Open No. H5-143260.

However, a paper out state of the cassette storing the paper could not be reproduced in the simulator for the software inspection in the past.

When the paper feed from the cassette stages is inspected, the software is often troublesome in the paper out state, for which the inspection of software is indispensable. For instance, if the paper out state occurs in a certain cassette, it is required to inspect from which cassette to feed the paper at the next time.

Moreover, when the paper is fed from different cassettes after the paper out state of the cassette turns out, the paper feed timing is delayed from the usual paper feed, involving a difficult sequence concerning how to absorb a difference in the timing.

Further, in the paper out state of the cassette, most problems often occur at the specific timings, such as "there is a problem when the paper out occurs at specific sequence number of paper in feeding the paper". In the paper out state, it is necessary to reproduce the phenomenon at the specific timings.

SUMMARY OF THE INVENTION

In order to solve the above-mentioned problems, it is an object of the invention to provide a design support program and a design support method that can generate the paper out state at arbitrary timing, and display the paper out state.

In order to accomplish the above object, the present invention provides a computer readable design support program for inspecting a processing operation of software that controls a sheet conveyance mechanism by displaying the behavior of feeding a virtual sheet from a virtual sheet stock portion on a display portion, comprising a sheets number setting procedure of setting the sheets number of virtual sheets stored in the virtual sheet stock portion, a sheet feed display procedure of displaying the behavior of feeding the virtual sheet from the virtual sheet stock portion on the display portion, a stored sheets number subtraction procedure of subtracting the stored sheets number of virtual sheets corresponding to the virtual sheet stock portion to which the virtual sheet is supplied in the sheet feed display procedure, a judgment procedure of judging whether or not the virtual sheet is used up in the virtual sheet stock portion where the stored sheets number of virtual sheets is subtracted in the stored sheets number subtraction procedure, and a paper out display procedure of displaying on the display portion the paper out on the virtual sheet stock portion for which it is judged that the virtual sheet is used up in the judgement procedure.

Also, the invention provides a design support method for inspecting a processing operation of software that controls a sheet conveyance mechanism by displaying the behavior of feeding a virtual sheet from a virtual sheet stock portion on a display portion, comprising a sheets number setting procedure of setting the sheets number of virtual sheets stored in the virtual sheet stock portion, a sheet feed display procedure of displaying the behavior of feeding the virtual sheet from the virtual sheet stock portion on the display portion, a stored sheets number subtraction procedure of subtracting the stored sheets number of virtual sheets corresponding to the virtual sheet stock portion to which the virtual sheet is supplied in the sheet feed display procedure, a judgment procedure of judging whether or not the virtual sheet is used up in the virtual sheet stock portion where the stored sheets number of virtual sheets is subtracted in the stored sheets number subtraction procedure, and a display procedure of displaying on the display portion the paper out on the virtual sheet stock portion for which it is judged that the virtual sheet is used up in the judgement procedure.

Other objects and features of the invention will be apparent from the following description and the drawings.

DESCRIPTION OF THE PREFERRED EMBODIMENTS

A design support apparatus of the present invention will be described below in more detail with reference to the drawings.

Embodiment 1

An embodiment 1 is firstly described. In this embodiment, when a virtual sheet is fed from a virtual cassette in a sheet conveyance simulation, it is judged whether or not the virtual cassette runs out of paper, and its judgment is displayed. Herein, the term “virtual” is employed to designate the virtual sheet and cassette on simulation.

Figure 1:
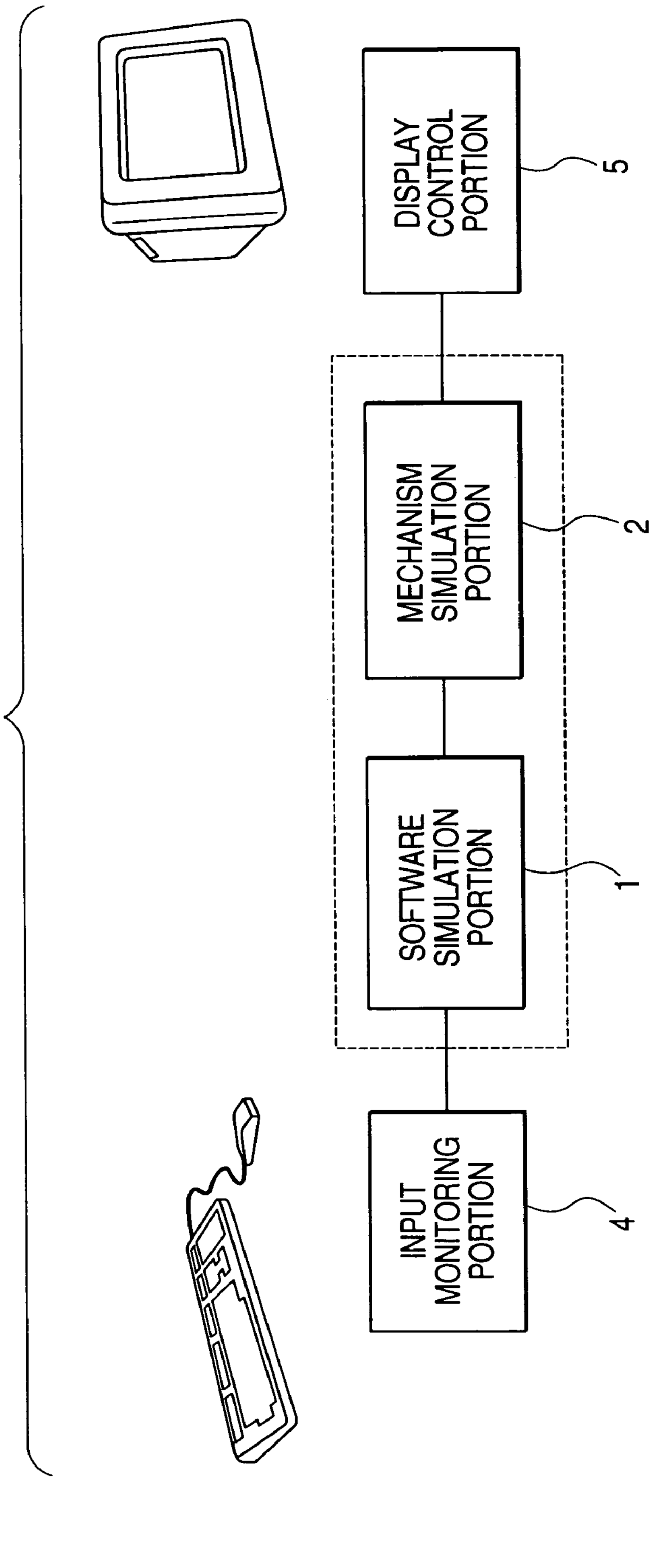
FIG. 1 is a control block diagram.

FIG. 1 is a design support apparatus according to this embodiment. The design support apparatus according to this embodiment is a sheet conveyance simulator that can perform the sheet conveyance simulation for an image forming apparatus on a personal computer. Also, this design support apparatus can support a control timing design of farm software for controlling a sheet conveyance mechanism in the image forming apparatus in the actual world to enable the inspection of a processing operation of farm software.

A software simulation portion 1 virtually performs the farm software concerning the sheet conveyance control on the personal computer. An input monitoring portion 4 monitors the input of a keyboard device or a mouse on a man machine interface and instructs the software simulation portion 1 to start execution of the software simulation.

The execution result of software simulation is passed to a mechanism simulation portion 2. The mechanism simulation portion 2 calculates at which position within the sheet conveyance mechanism the virtual sheet resides from the speed of a virtual roller involving the sheet conveyance control, and passes it to the software simulation portion 1 or a display control portion 5.

Figure 3:
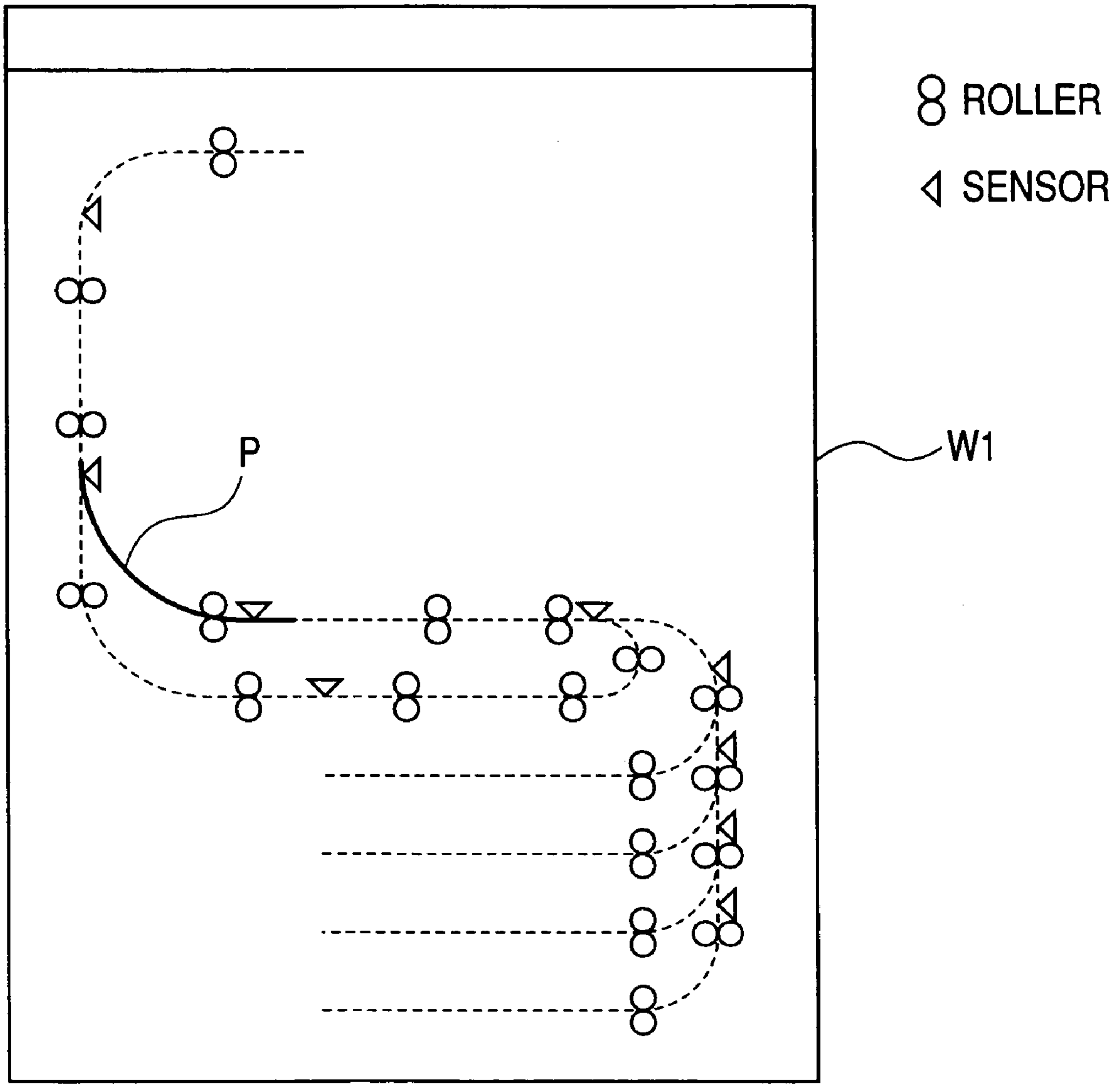
FIG. 3 is a screen display image view.

The display control portion 5 displays a sheet conveyance simulation screen W1 as shown in FIG. 3 on a display associated with the personal computer. On the sheet conveyance simulation screen W1, a virtual sheet conveyance path is denoted by the dotted line, the virtual roller is denoted by circle, a virtual sensor is denoted by triangle, and the virtual sheet is denoted by the solid line P.

The software simulation portion 1 and the mechanism simulation portion 2 as described here are stored in an HDD or the like (not shown) of the personal computer before execution, and expanded and executed over a RAM (not shown) of the personal computer.

Figure 2:
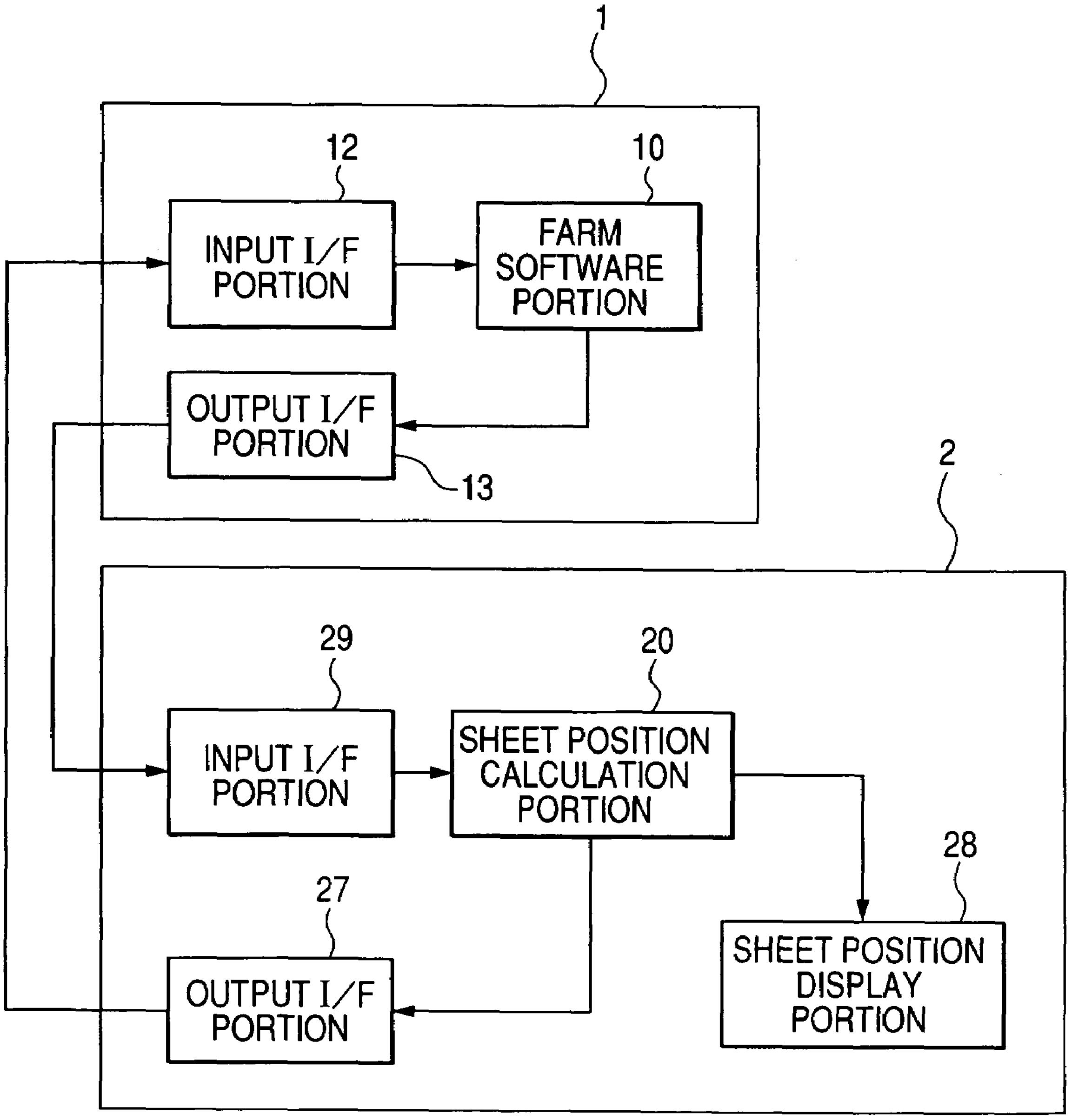
FIG. 2 is a detailed control block diagram.

FIG. 2 shows the configuration of the software simulation portion 1 and the mechanism simulation portion 2 for the design support apparatus according to this embodiment.

The software simulation portion 1 comprises a farm software portion 10, an input I/F portion 12 and an output I/F portion 13.

The farm software portion 10 is the software for making the sheet conveyance control of the image forming apparatus in the actual world. The input I/F portion 12 inputs the information from the mechanism simulation portion 2. The output I/F portion 13 outputs the information to the mechanism simulation portion 2.

The mechanism simulation portion 2 comprises a sheet position calculation portion 20, an input I/F portion 29, an output I/F portion 27, and a sheet position display portion 28.

The input I/F portion 29 accepts the output result from the output I/F portion 13 of the software simulation portion 1, and passes the control information of various devices such as a virtual motor, a virtual clutch, and a virtual flapper involving the sheet conveyance control to the latter stage.

The sheet position calculation portion 20 calculates a conveying speed on the virtual sheet conveyance path from the control information of the virtual motor, the virtual clutch and the virtual flapper involving the sheet conveyance control, and calculates the leading position and the trailing position of the virtual sheet.

The sheet position display portion 28 instructs the display control portion 5 to display the sheet conveyance simulation screen W, based on the leading position and the trailing position of the virtual sheet that are calculated by the sheet position calculation portion 20 at the former stage.

The output I/F portion 27 gives the sheet position information set by the sheet position calculation portion 20 at the former stage to the input I/F portion 12 of the software simulation portion 1.

Figure 4:
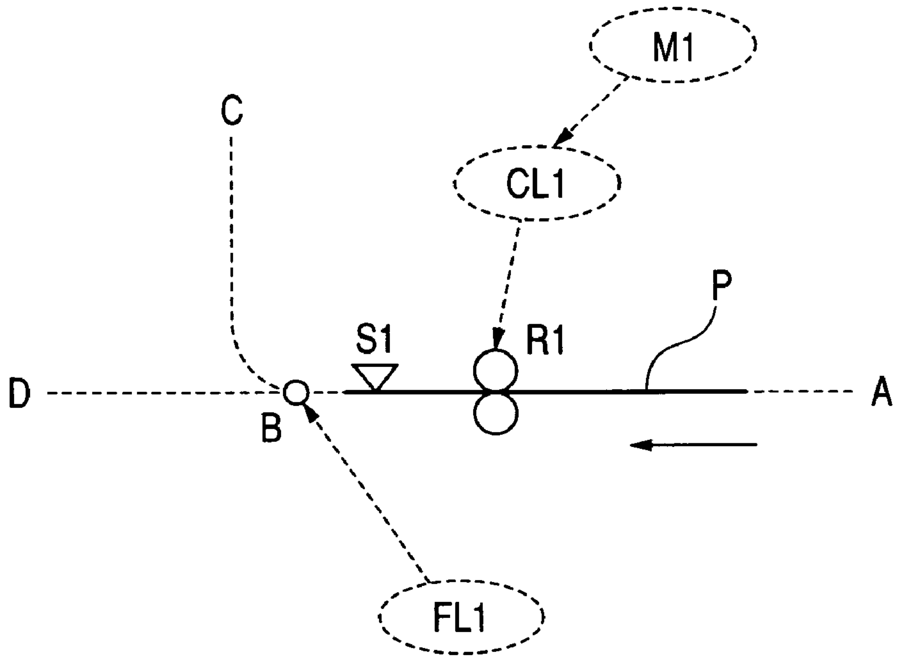
FIG. 4 is a view for explaining a sheet conveyance simulation.

Referring to FIG. 4, the actual simulation operation will be described below. FIG. 4 is an arrangement example of various devices regarding the sheet conveyance control. In the simulation, it is premised that the virtual sheet P is conveyed in a direction of the arrow of the solid line on the path AB by the virtual roller R1, and moved to the path BC or path BD by switching the virtual flapper FL1 at a timing when the leading edge of the virtual sheet P passes the virtual sensor S1. The virtual roller R1 is driven from the virtual motor M1 via the virtual clutch CL1. The arrow of the dotted line indicates the driving relation.

If the designer instructs to start the sheet conveyance simulation from the keyboard or mouse on the man machine interface, the software simulation portion 1 and the mechanism simulation portion 2 are executed via the input monitoring portion 4. If the software simulation portion 1 is started the farm software portion 10 successively executes the software for making the sheet conveyance control of the image forming apparatus in the actual world in cooperation with a wrapper portion 11.

If a process of rotating the virtual motor M1 is started in the farm software portion 10, the ID number specifying the virtual motor M1, the rotation speed and the rotation direction are given as a command via the output I/F portion 12 to the input I/F portion 23 of the mechanism simulation portion 2. The input I/F portion 23 interprets the command, and passes it to the sheet position calculation portion 20.

The sheet position calculation portion 20 starts the rotation of the virtual motor M1, and calculates the rotation speed and the rotation direction by retrieving the virtual roller or virtual clutch driven by the virtual motor M1. Since the virtual roller R1 is driven via the virtual clutch CL1, the information of the rotation speed and rotation direction of the virtual roller R1 is calculated based on the ON/OFF information of the virtual clutch CL1.

The sheet position calculation portion 20 calculates the leading and trailing positions of the virtual sheet P at a regular interval t. First of all, the information of the path AB including the leading edge to the trailing edge of the virtual sheet P is acquired. The path information also includes the ID of the virtual roller within each path and its positional information, in which the virtual roller is retrieved in a direction from the leading position to the trailing position of the virtual sheet P, and the speed v corresponding to the ID of the virtual roller R1 found firstly is acquired. The position of the virtual sheet P is updated by calculating the distance $S=v\times t$ by which the virtual sheet P advances from the speed v and the time interval t. The updated position information is passed to the sheet position display portion 28, and displayed on the sheet conveyance simulation screen W1.

The path information also includes the ID of the virtual sensor within each path and its positional information. The sheet position calculation portion 20 retrieves the virtual sensor in the direction from the leading position to the trailing position of the virtual sheet P, and sends the ON information of the virtual sensor S1 found to the output I/F portion 27. Also, the OFF information of the virtual sensor S1 is sent to the output I/F portion 27 in a state where the trailing edge of the virtual sheet P passes the virtual sensor S1.

The output I/F portion 27 makes a command from the ON information or OFF information of the virtual sensor S1 and outputs it to the input I/F portion 12 of the software simulation portion 1.

The farm software portion 10 receives the ON information of the virtual sensor S1 from the input I/F portion 12, and starts to control the virtual flapper FL1. The command is also sent to the mechanism simulation portion 2 in the same way as the virtual motor M1. Upon receiving a control command of the virtual flapper FL1, the sheet position calculation portion 20 decides the next path for advancement if the leading edge of the virtual sheet P reaches a branch point B, and judges whether the advancing direction of the virtual sheet P is the path BC or path BD depending on a switched state of the virtual flapper FL1.

Figure 5:
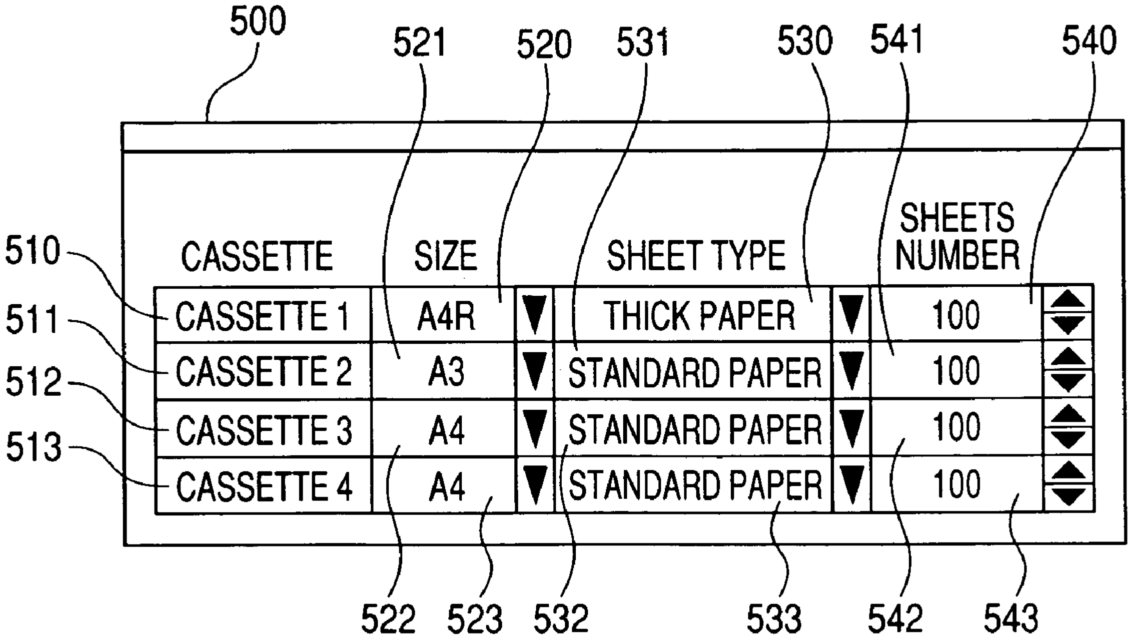
FIG. 5 is a diagram showing a cassette sheet window of an embodiment 1.

In FIG. 5, reference numeral 500 designates a cassette sheet window. This window is employed in referring to the settings of virtual sheet in the virtual cassettes and the current state of virtual sheet in the virtual cassettes. Reference numerals 510 to 513 designate the name columns. The name of each virtual cassette is displayed here. Reference numerals 520 to 523 designate the size columns. The size information of the virtual sheet existing within each virtual cassette is displayed here. Reference numerals 530 to 533 designate the sheet type columns. The information of sheet type existing within each virtual cassette is displayed here. Reference numerals 540 to 543 designate the sheets number columns. The number of virtual sheets (sheets number information) existing within each virtual cassette is displayed here.

Figure 6:
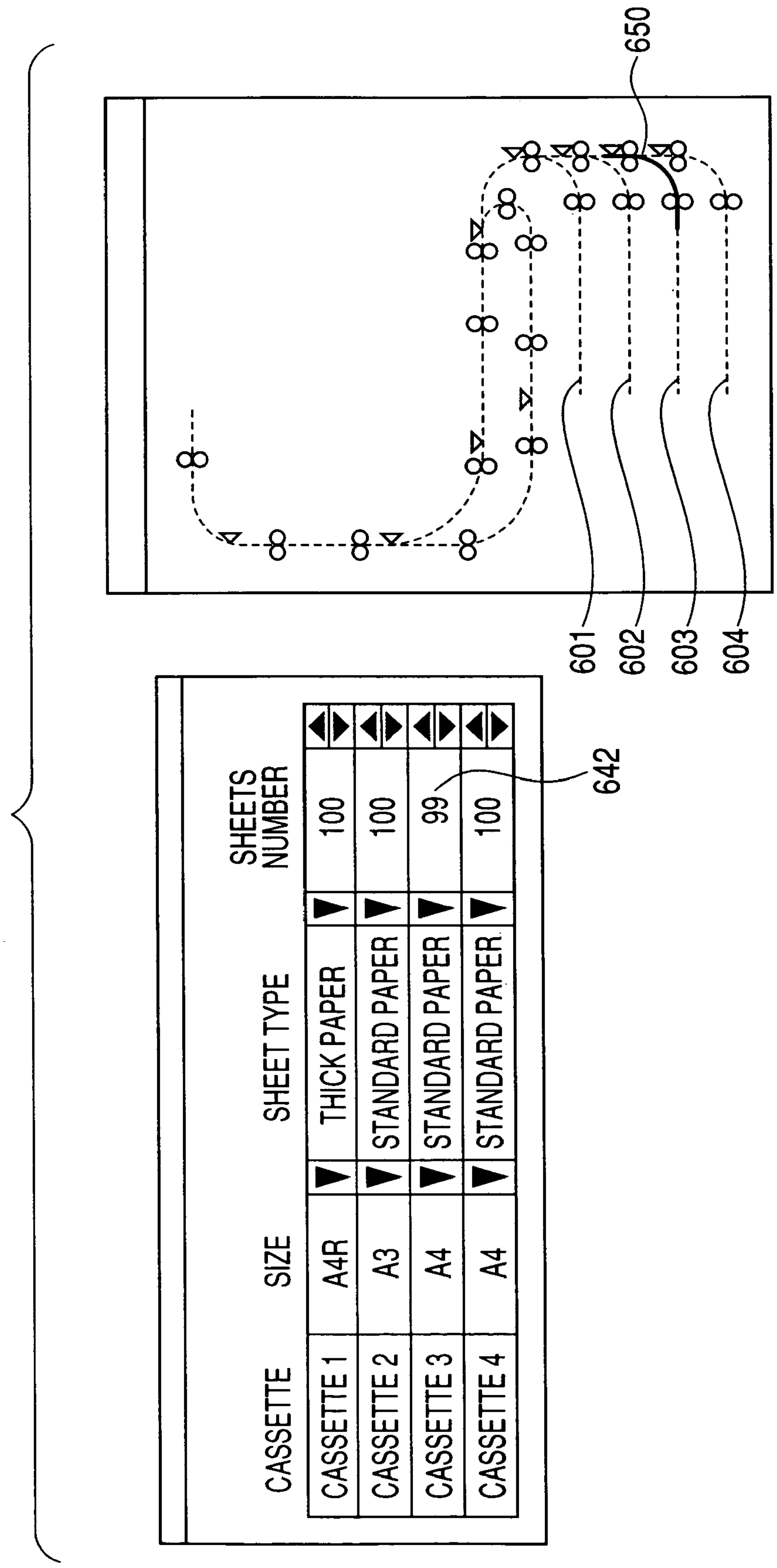
FIG. 6 is a diagram showing a display example in an A4, sheet feed sequence of the embodiment 1.

FIG. 6 is a display when the sheet feed simulation of one sheet from the virtual cassette 3 is performed from the state of FIG. 5. In FIG. 6, how the cassette sheet window of FIG. 5 and the sheet conveyance simulation screen of FIG. 3 are changed are shown.

In the sheet feed from the virtual cassette 3 from the state of FIG. 5, the sheet is fed from the corresponding virtual cassette 3 (603). Reference numeral 601 corresponds to the virtual cassette 1, 602 corresponds to the virtual cassette 2, and 604 corresponds to the virtual cassette 4. Reference numeral 650 designates the virtual sheet, in which the sheet is fed from the virtual cassette 3, and slightly moved. At this time, since the sheet size information of the virtual cassette 3 is A4, the length of sheet is equivalent to A4.

If the sheet is fed from the virtual cassette 3, the stored sheets number (sheets number information) of virtual sheets within the virtual cassette 3 is decremented, and displayed like 642 in less quantity than 542 in FIG. 5. In this way, the stored sheets number (sheets number information) of virtual sheets is decremented every time the sheet is fed, and corresponding displayed in decremented quantity. Also, this processing is performed every time the sheet is fed.

If the sheet is fed from the virtual cassette in this way, the sheet feed simulation is made from the corresponding virtual cassette, and displayed, while the sheets number information of the corresponding virtual cassette is decremented, and displayed. This is similarly performed for other virtual cassettes.

Figure 7:
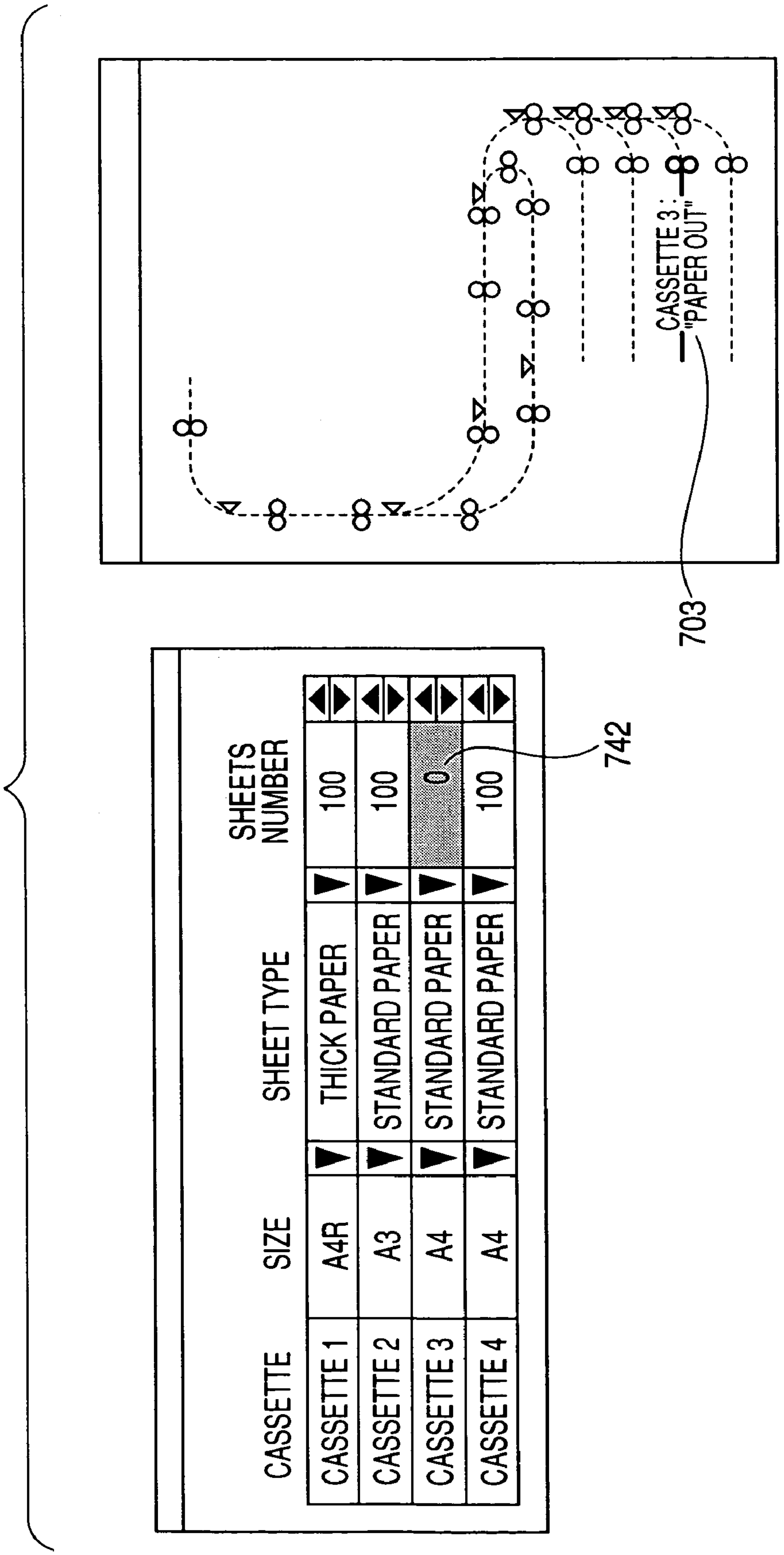
FIG. 7 is a diagram showing a display example for the paper out in the embodiment 1.

FIG. 7 is a display when the sheets are further fed from the virtual cassette 3 via the state from FIG. 5 to FIG. 6. Though the sheets number within the virtual cassette is decremented every time the sheet feed simulation is made as previously described in connection with FIG. 6, the sheets are continued so that the sheets number information reaches 0 in FIG. 7.

In 742, the sheets number indication is 0 and displayed in black and white reversal to be easily seen from the user. Also, cassette 3: "paper out" is displayed corresponding to the virtual cassette 3 on the right sheet conveyance simulation screen, and the virtual cassette and the virtual roller within the virtual cassette are emphasized in the bold line to be easily seen from the user.

When the paper out occurs, a paper out state is notified from the output I/F portion 27 of the mechanism simulation portion 2 of FIG. 2 to the input I/F portion 12 of the software simulation portion 1. Thereby, the paper out is recognizable from the farm software portion 10, which can perform a process for recognizing the paper out.

Figure 8A:
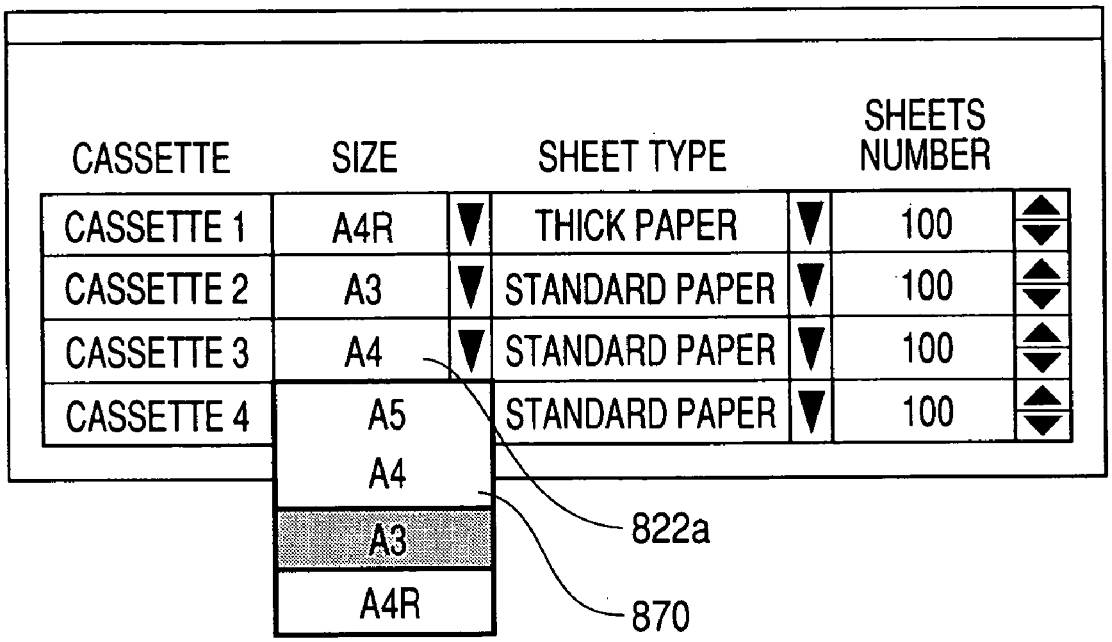
FIGS. 8A and 8B are diagrams showing a cassette size-setting example of the embodiment 1.
Figure 8B:
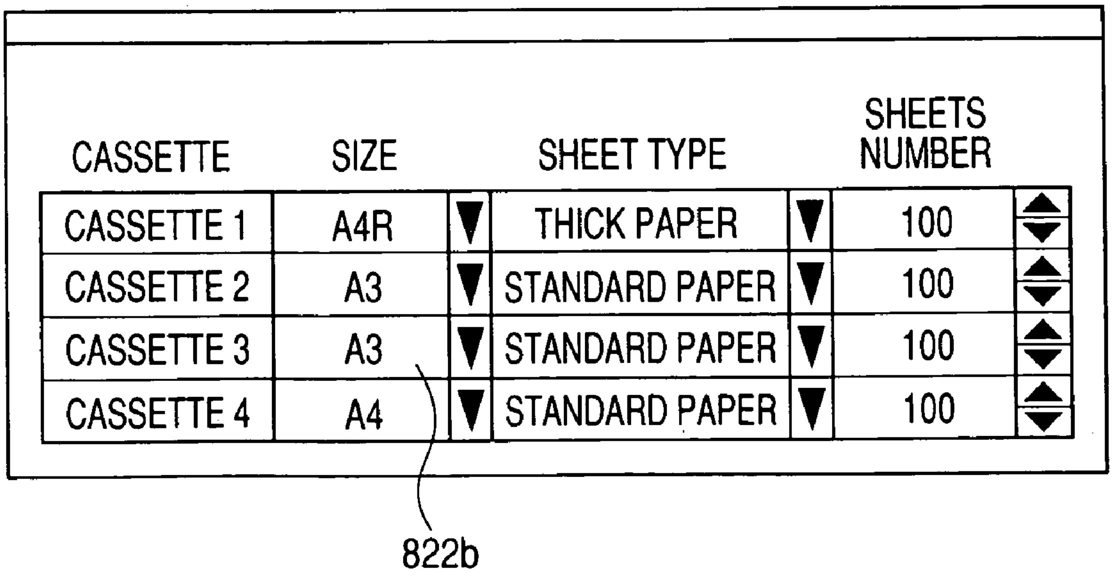

Referring to FIGS. 8A and 8B, the switching of size within the virtual cassette will be described below. FIG. 8A is a screen when a part 522 of the sheet size indication corresponding to the virtual cassette 3 is clicked from the state of FIG. 5. If the part 522 (822*a* in FIG. 8A) is clicked, a selection box 870 appears under 822*a* as shown in FIG. 8A. If the size is selected from this selection box, the size information of the virtual sheet is changed to the selected size, which is informed via the output I/F portion 27 of the simulator portion of FIG. 2 and the input I/F portion 12 of the software simulation portion 1 to the farm software portion 10. The display of the sheet position display portion 28 is also changed.

FIG. 8B is a screen after A3 is selected in 870 from the state of FIG. 8A. In FIG. 8B, the indication is changed to A3 in 822*b*.

Figure 9:
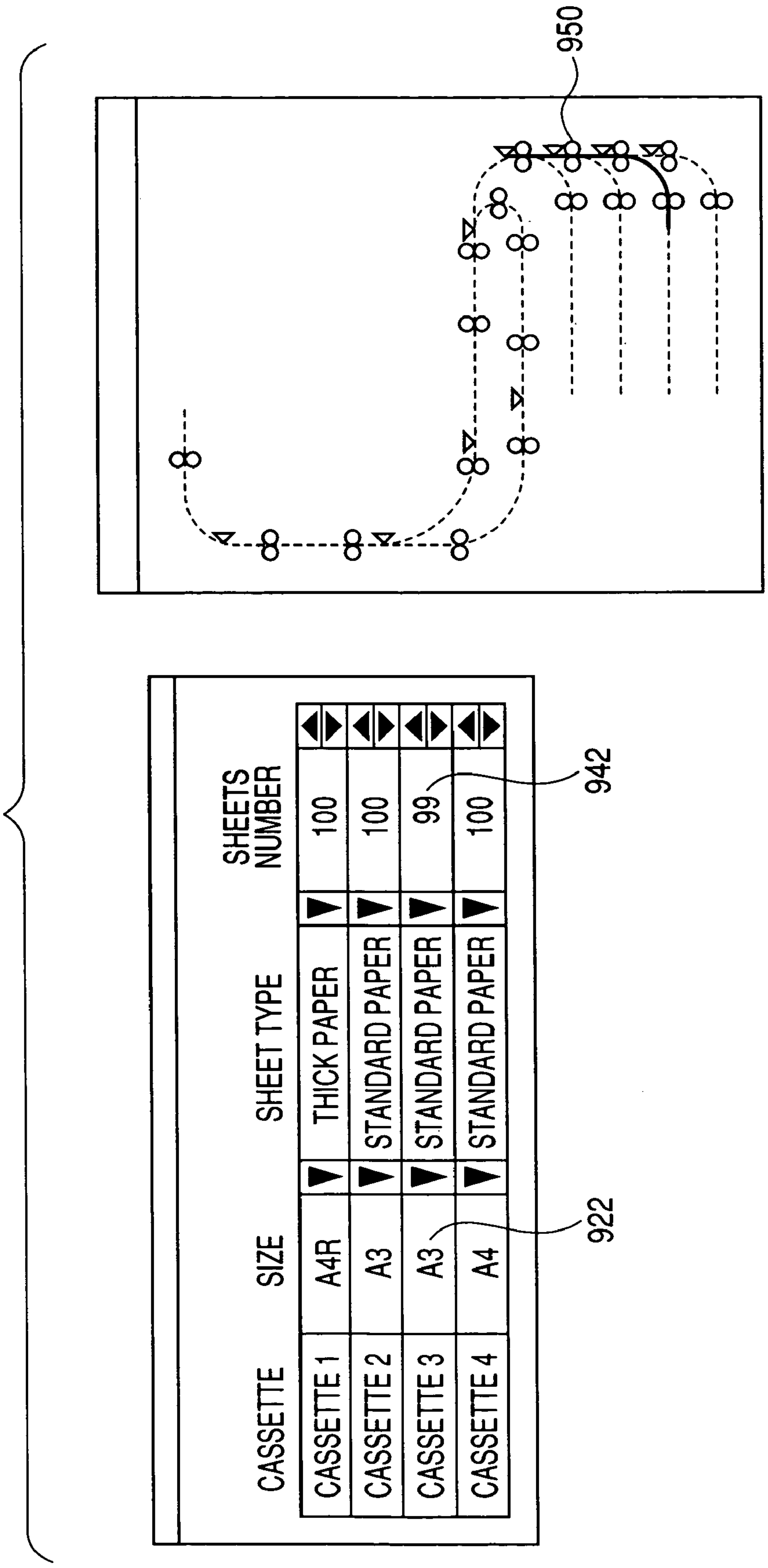
FIG. 9 is a diagram showing a display example in an A3 sheet feed sequence of the embodiment 1.

FIG. 9 is a display when the sheet feed simulation of one sheet from the virtual cassette 3 is made from the state of FIG. 8B. The sheets number information is decremented by one in the same way as when the sheet feed simulation is made from the settings of FIG. 5, whereby the indication of 942 is decreased from 100 to 99. In the right sheet conveyance simulation, because the sheet size information of the virtual cassette 3 is A3 at this time, the virtual sheet 950 has the length corresponding to A3. A difference from the length of the virtual sheet 650 of A4 size in FIG. 6 is apparent.

As seen from FIG. 9, the actual simulation and its display are reflected by changing the sheet size of the virtual cassette as described in connection with FIGS. 8A and 8B.

Though not described in detail here, if the sheets number information reaches 0 in this simulation of A3, naturally, the paper out state and its display as described in connection with FIG. 7 become effective, whereby the paper out state through the simulation with different sheet size can be regenerated.

Also, though not described in detail here, the sheet type information of 530 to 533 in FIG. 5 is notified to the farm and the display is updated in the same way as when the sheet size is changed as described above.

Figure 10:
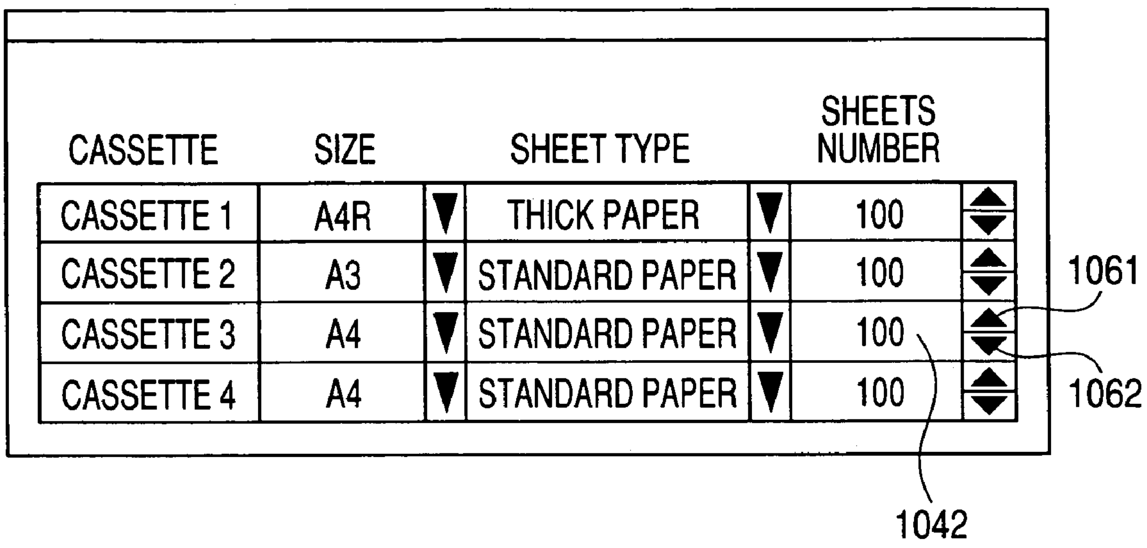
FIG. 10 is a diagram showing a sheets number setting example of the embodiment 1.

Referring to FIGS. 10 to 13, the settings of the sheet size within the virtual cassettes will be described below. FIG. 10 shows a cassette sheet window. In this window, the item 1042 corresponding to the virtual cassette 3 is taken as an example.

Figure 11:
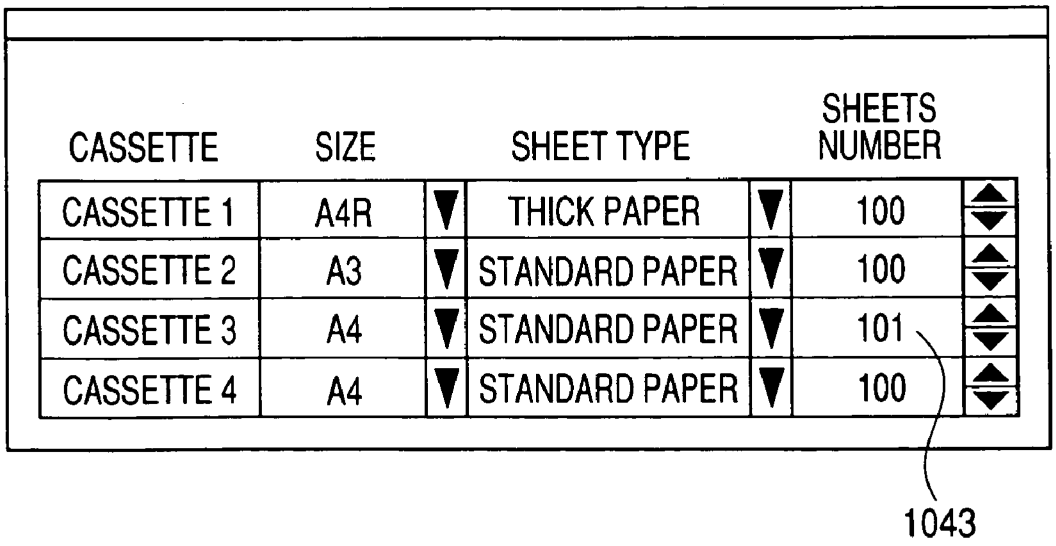
FIG. 11 is a diagram showing a sheets number setting example of the embodiment 1.

In FIG. 10, reference numeral 1061 designates a sheets number up button. If this button is pressed, the sheets number information of the virtual cassette 3 is incremented by one, and the indication of 1042 is also incremented by one. FIG. 11 shows a display when the sheets number up button 1061 is pressed once in FIG. 10. In FIG. 11, the indication of 1043 is changed to 101.

Figure 12:
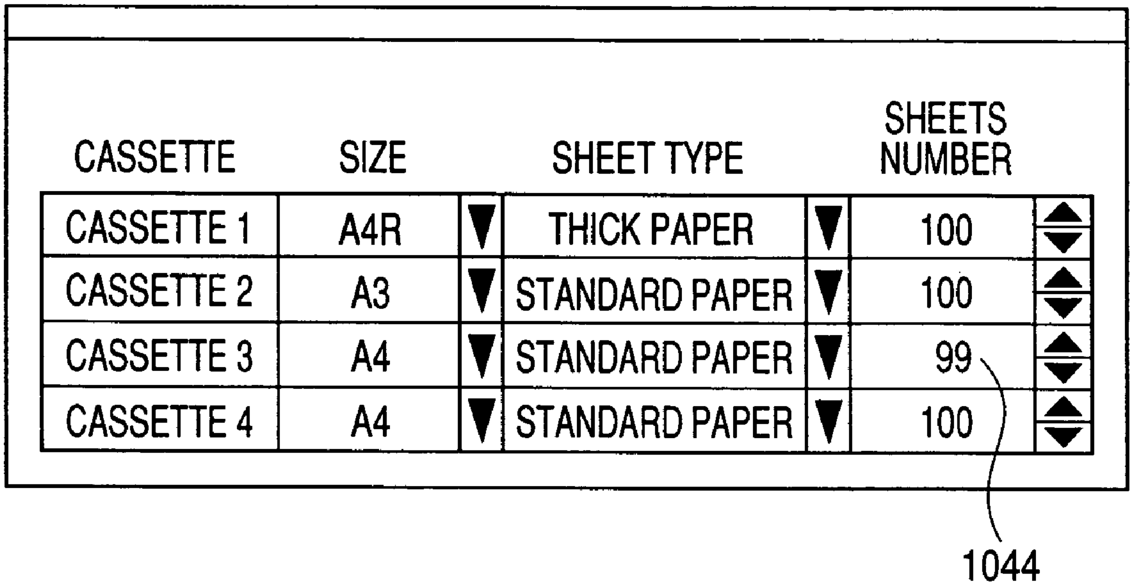
FIG. 12 is a diagram showing a sheets number setting example of the embodiment 1.

In FIG. 10, reference numeral 1062 designates a sheets number down button. If this button is pressed, the sheets number information of the virtual cassette 3 is decremented by one, and the indication of 1042 is also decremented by one. FIG. 12 shows a display when the sheets number down button 1062 is pressed once in FIG. 10. In FIG. 12, the indication of 1044 is changed to 99.

Figure 13:
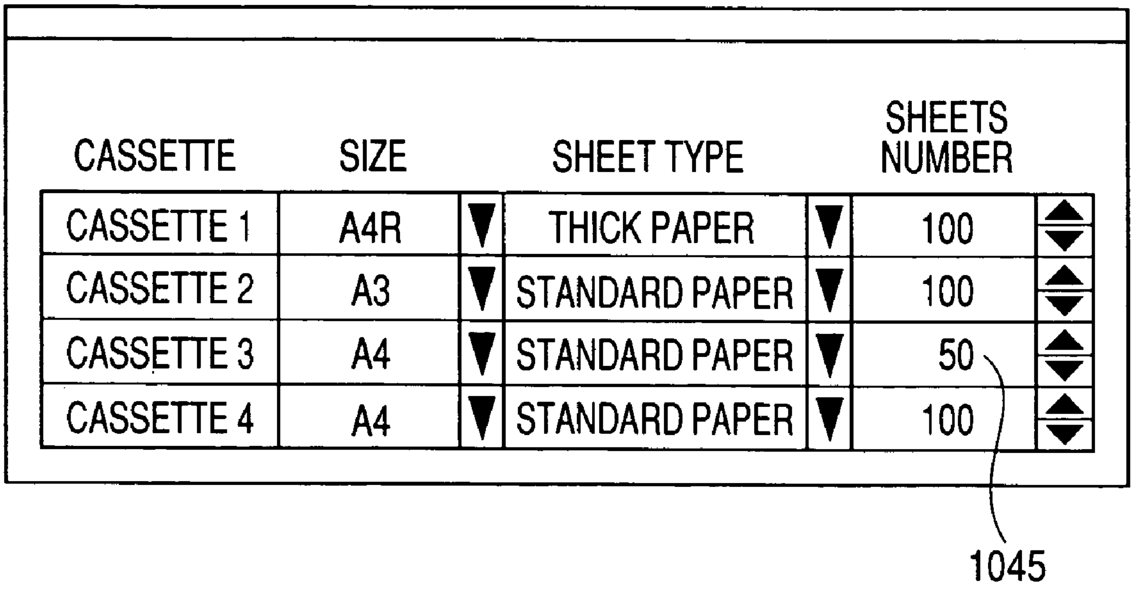
FIG. 13 is a diagram showing a sheets number setting example of the embodiment 1.

Also, if the item 1042 of FIG. 10 is clicked, one can write a favorite number into the item, whereby the sheets number information can be set to the favorite value. FIG. 13 shows a display when 1042 is clicked and 50 is entered. In FIG. 13, the indication of 1045 is changed to 50.

Though not described in detail here, if the sheets number information reaches 0 in this sheets number information simulation, naturally, the paper out state and its display as described in connection with FIG. 7 become effective, whereby the paper out state through the sheet feed simulation with different sheets number can be regenerated.

Figure 14:
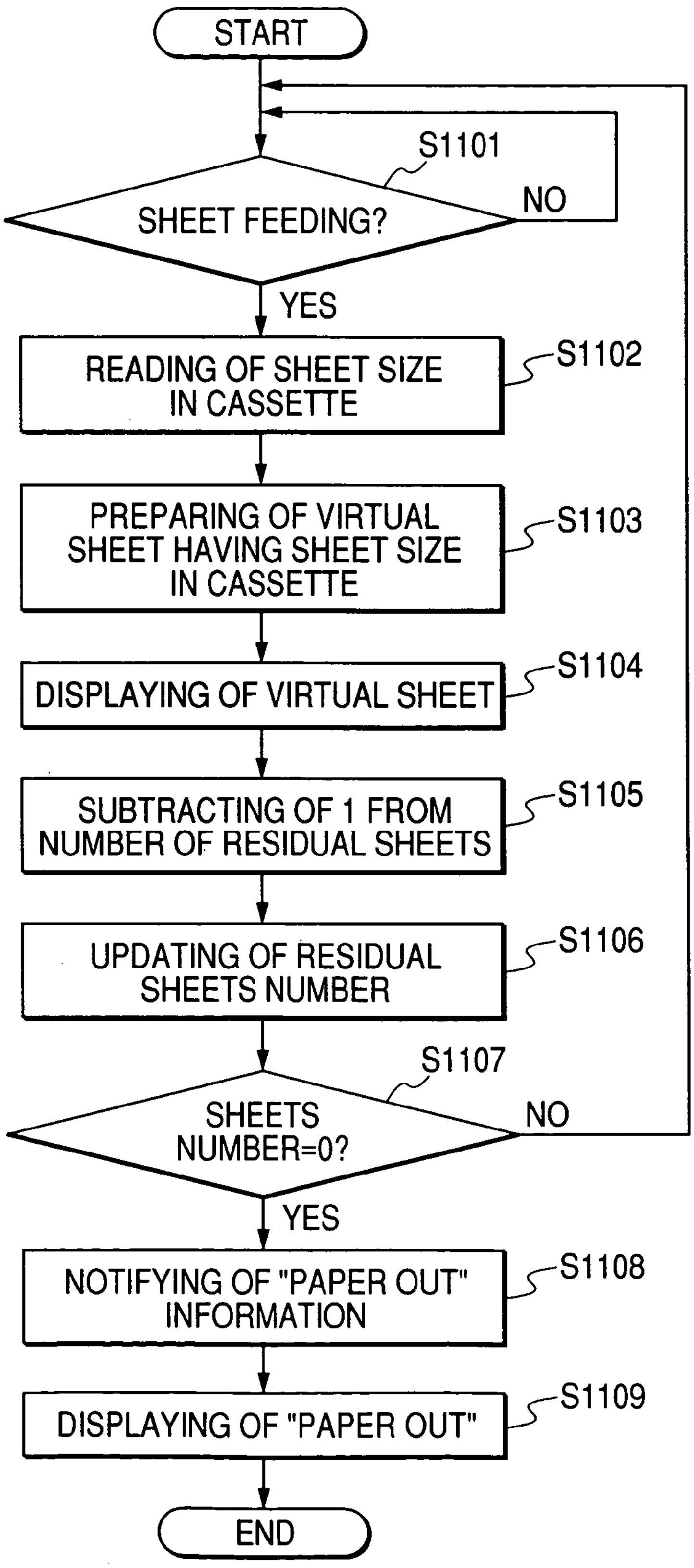
FIG. 14 is a flowchart showing a sequence of the embodiment.

Referring to FIG. 14, a sequence of the simulator in this embodiment will be described below. This sequence involves a process of feeding the sheet in the simulation, and rises when this simulator is started. Also, this sequence is provided for every virtual cassette, whereby the number of sequences is equal to the number of virtual cassettes.

First of all, at step S1501, it is judged whether or not the sheet is fed. This simulator monitors the input state from the input I/F portion 29 on the mechanism simulation portion 2 via the output I/F portion 13 from the software simulation portion 1 of FIG. 1, whereby it is judged whether or not the state corresponds to the sheet feeding. If it is judged at step S1501 that the sheet is not fed, step S1501 is repeated until the sheet feed is ready.

If it is judged at step S1501 that the sheet is fed, the sheet size of the virtual cassette is read at step S1502. Then, at step S1503, the virtual sheet of the sheet size information read at step S1502 is prepared. If the virtual sheet is prepared at step S1503, the virtual sheet prepared at step S1503 is displayed (650 in FIG. 6, 950 in FIG. 9).

If step S1504 is ended, the sheets number information is decremented by one at step S1505. After the end of step S1505, the indication of sheets number information is updated at step S1506 (542 of FIG. 5 to 642 of FIG. 6). After the end of step S1506, it is judged whether or not the sheets number information of this virtual cassette reaches 0 at step S1507. If it is judged at step S1507 that the sheets number information does not reach 0, the procedure returns to step S1501 to become a sheet feeding wait state. If it is judged at step S1507 that the sheets number information reaches 0, the procedure goes to step S1508 to notify the paper out information through the output I/F portion 27 and the input I/F portion 12 of FIG. 2 from the mechanism simulation portion 2 to the software simulation portion 1.

If step S1508 is ended, the "paper out" is displayed by the display control portion 5 at step S1509 (742 and 703 in FG. 7). If step S1509 is ended, the procedure is ended.

If the procedure is ended here, the display control portion 5 cancels the display of "paper out" when the virtual sheets within the virtual cassette are reset separately and the sheets number information is not zero. And the canceled paper out state is notified through the output I/F portion 27 and the input I/F portion 12 of FIG. 2 from the mechanism simulation portion 2 to the software simulation portion 1, and this sequence is started again.

As described above, in this embodiment, the paper out state turns effective at the timing when the virtual sheet runs out, whereby the minute sheet conveyance simulation is enabled. Also, the sheet size and the sheets number can be set as the sheet information of the virtual cassette, whereby various simulations can be performed simply and the paper out state through the simulation can be implemented. Thereby, the inspection efficiency of the farm software can be improved.

Embodiment 2

In an embodiment 2, the basic configuration is the same as in the embodiment 1. Hence, different points from the embodiment 1 are only described by quoting the contents of the embodiment 1. The explanation up to FIG. 4 is the same as in the embodiment 1, and omitted here.

Figure 15:
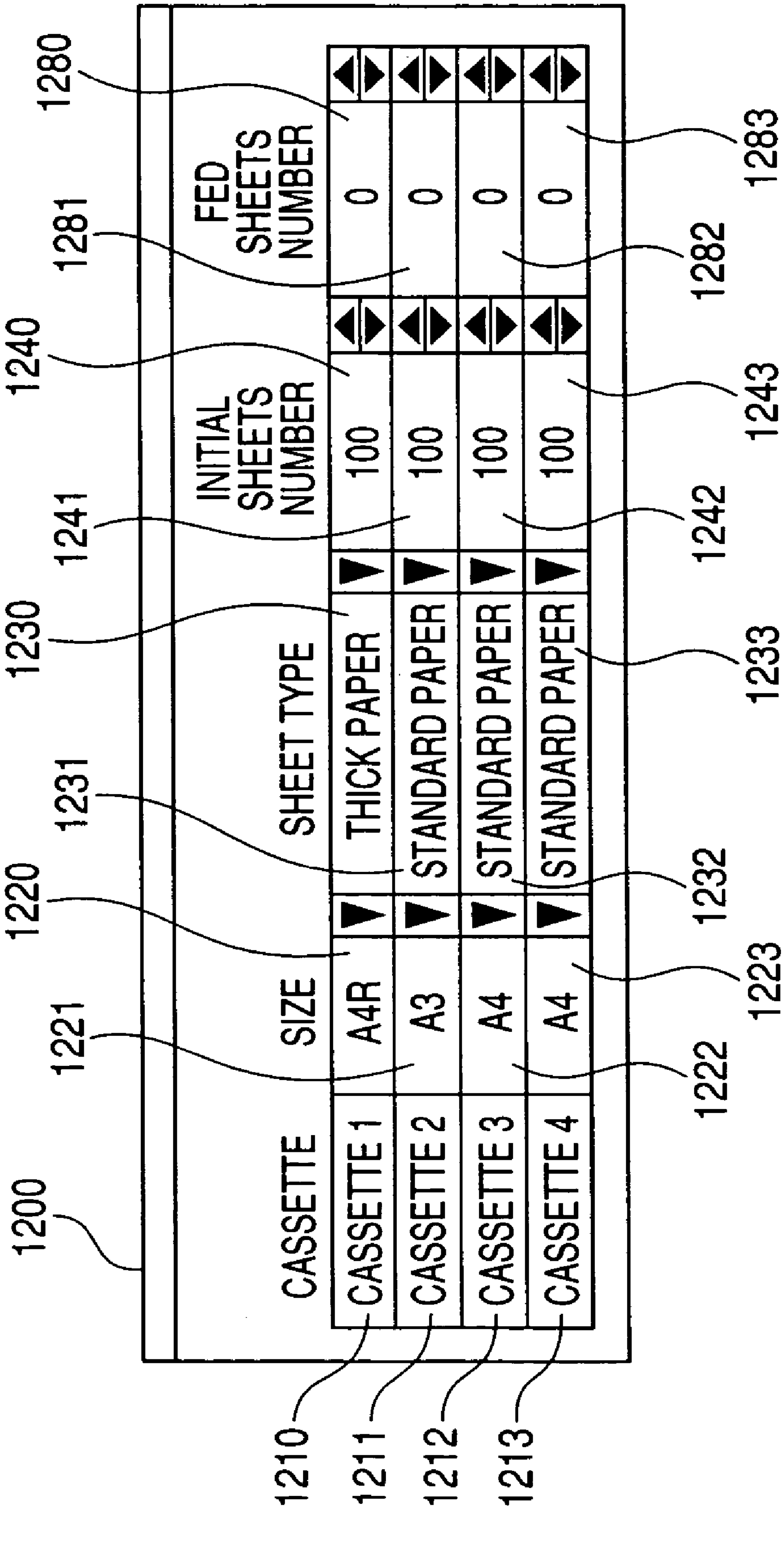
FIG. 15 is a diagram showing a cassette sheet window of an embodiment 2.

FIG. 15 is a screen of a cassette sheet window in this embodiment. Since the items 1200 to 1233 are equivalent to the items 500 to 533 in FIG. 5, other items will be described. Reference numerals 1240 to 1243 designate the initial sheets number columns, where the initial value of the sheets number contained in the virtual cassette is indicated. Reference numerals 1280 to 1283 designate the fed sheets number columns for indicating the number of fed sheets.

Figure 16:
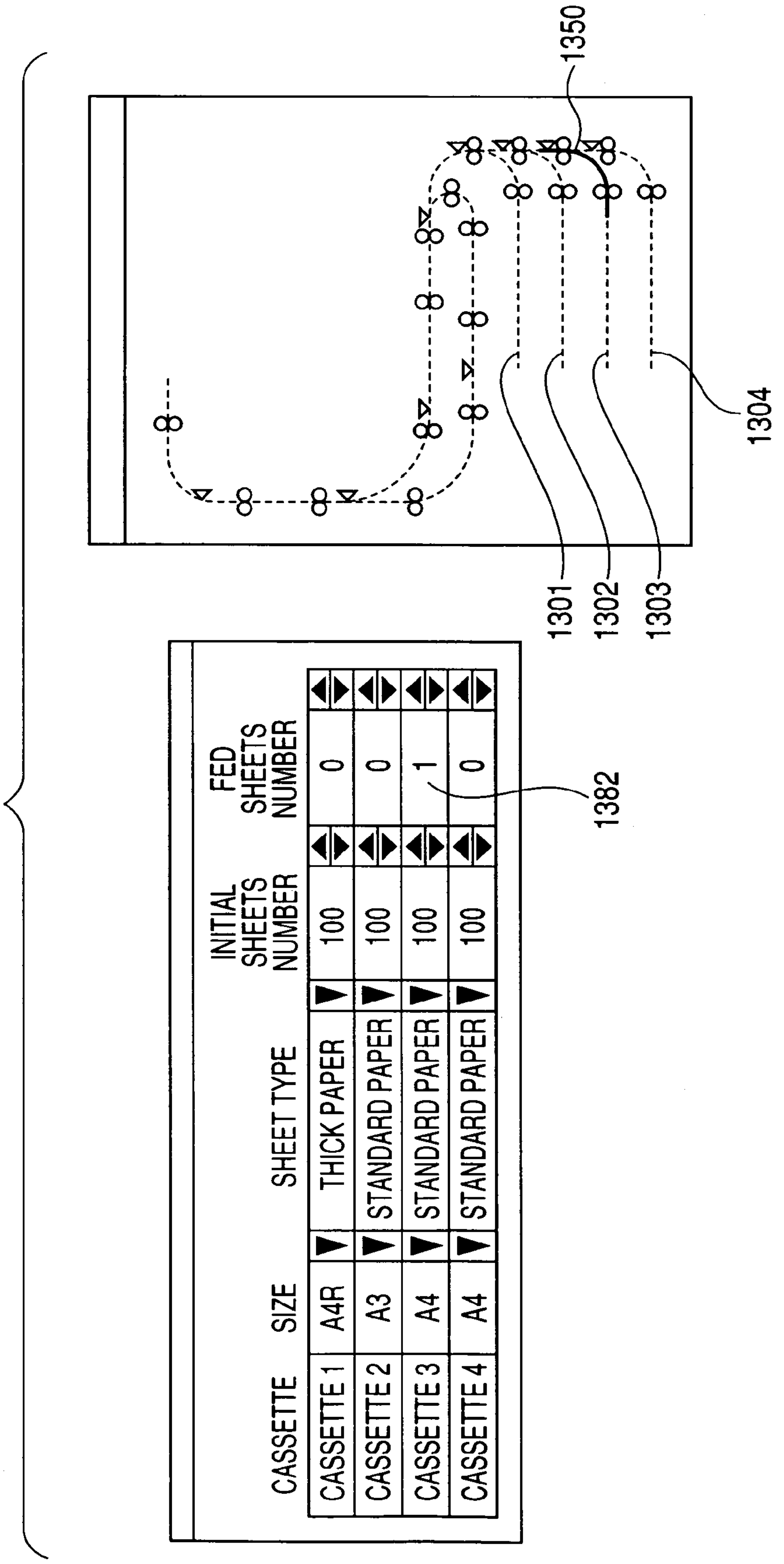
FIG. 16 is a view showing a display example in an A4 sheet feed sequence of the embodiment 2.

FIG. 16 is a display when the sheet feed simulation of one sheet from the virtual cassette 3 is performed from the state of FIG. 5. The items 1301 to 1304 and 1350 are equivalent to the items 501 to 504 and 550 of FIG. 5, and the item 1382 will be only described here.

If the sheet is fed from the virtual sheet cassette 3, the fed sheets number of the virtual cassette 3 is incremented, so that the indication of 1382 is incremented by one as compared with 1282 of FIG. 15. The fed sheets number information is incremented every time the sheet is fed in this way, and the indication is increased correspondingly. Also, this processing is performed every time the sheet is fed. This processing is also performed for other virtual cassettes.

Figure 17:
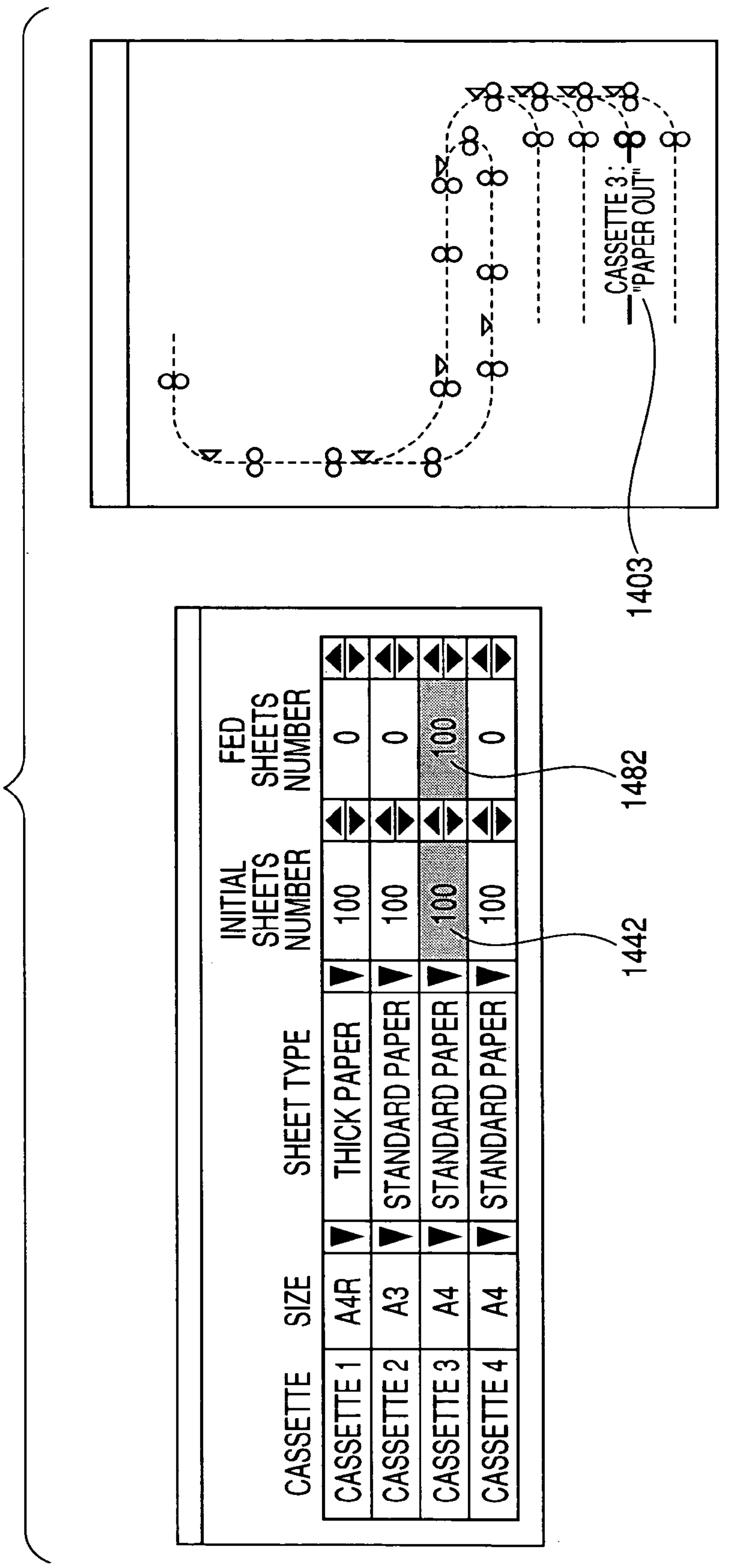
FIG. 17 is a diagram showing a display example for the paper out in the embodiment 2.

FIG. 17 is a display when the sheet is fed consecutively from the virtual cassette 3 through the state from FIG. 15 to FIG. 16. Though the fed sheets number is incremented every time the simulation of sheet feeding is performed as described with FIG. 15, FIG. 17 shows a state when the sheet is fed consecutively so that the fed sheets number information is equal to the initial sheets number. In 1482, the sheets number indication is 100 and displayed in black and white reversal to be easily seen from the user. Moreover, the initial sheets number 1442 of the virtual cassette 3 is also displayed in black and white reversal.

Also, cassette 3: "paper out" is displayed corresponding to the virtual cassette 3 on the right sheet conveyance simulation screen, and the virtual cassette and the virtual roller within the virtual cassette are emphasized in the bold line to be easily seen from the user.

Also, when the paper out occurs, a paper out state is notified through the output I/F portion 27 and the input I/F portion 12 of FIG. 2 from the mechanism simulation portion 2 to the software simulation portion 1. Thereby, the paper out is recognizable from the farm software portion 10, which can perform a process for recognizing the paper out.

Also, in this embodiment, the sheet size can be changed by selection in the same way as in FIGS. 8A and 8B of the embodiment 1. Also, the initial sheets number and the fed sheets number can be directly inputted or increased or decreased by a button in the same way as in FIG. 10 of the embodiment 1. Hence, the details thereof are not described in this embodiment.

Figure 18:
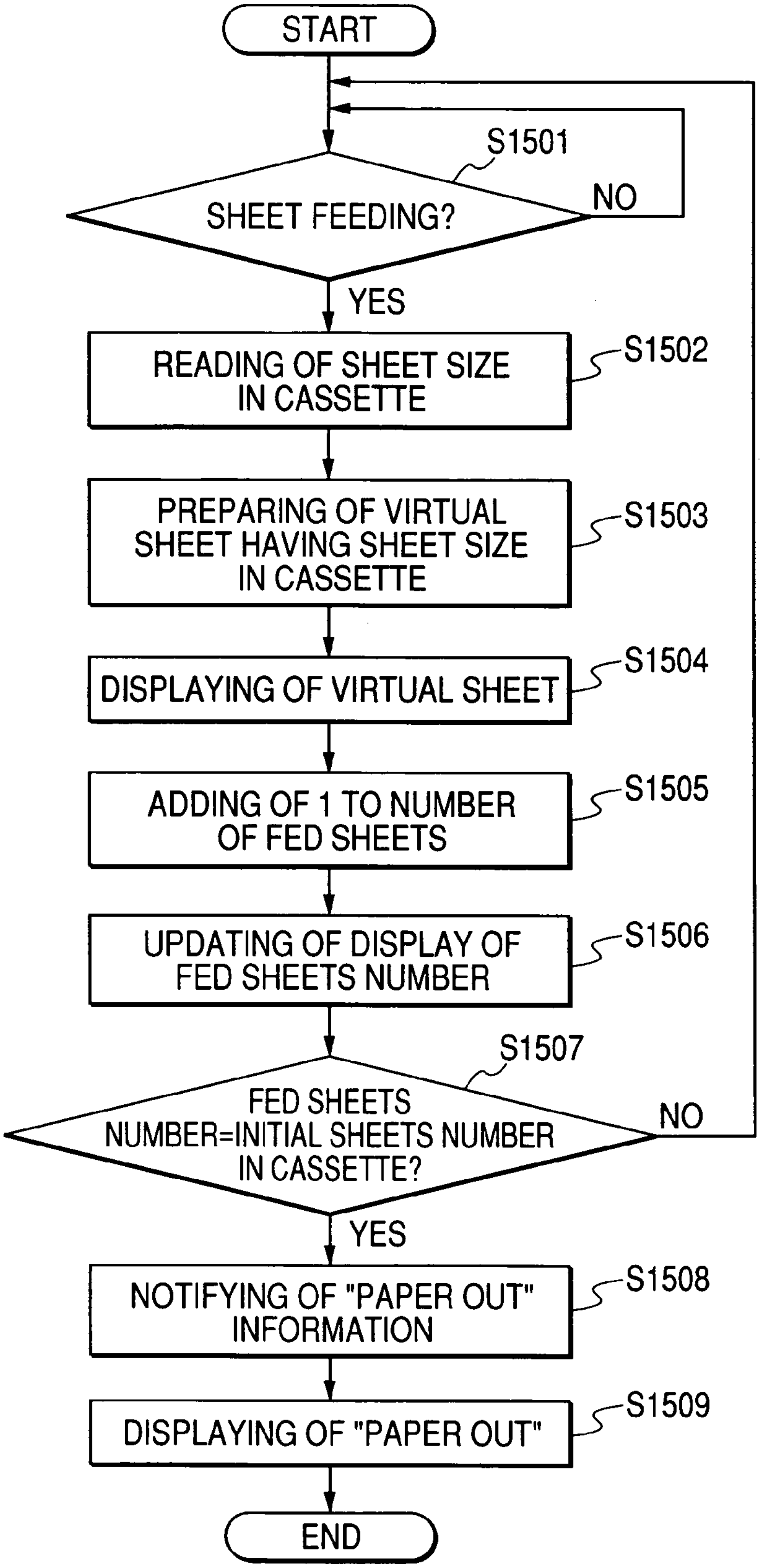
FIG. 18 is a flowchart showing a sequence of the embodiment; 2.

Referring to FIG. 18, a sequence of this embodiment will be described below. This sequence involves a process of feeding the sheet in the simulation, and rises when this simulator is started. Also, this sequence is provided for every virtual cassette, whereby the number of sequences is equal to the number of virtual cassettes. First of all, at step S1501, it is judged whether or not the sheet is fed.

This simulator monitors the input state from the input I/F portion 29 on the mechanism simulation portion 2 via the output I/F portion 13 from the software simulation portion 1 of FIG. 1, and it is judged whether or not the state corresponds to the sheet feeding. If it is judged at step S1501 that the state is not the sheet feeding, step S1501 is repeated until the state is the sheet feeding. If it is judged at step S1501 that the sheet is fed, the sheet size of the virtual cassette is read at step S1502. Then, at step S1503, the virtual sheet of the sheet size information read at step S1502 is prepared.

If the virtual sheet is prepared at step S1503, the virtual sheet prepared at step S1503 is displayed (1350 in FIG. 16). If step S1504 is ended, the sheets number information is incremented by one at step S1505. After the end of step S1505, the indication of sheets number information is updated by the display control portion 5 at step S1506 (1282 of FIG. 15 to 1382 of FIG. 16). After the end of step S1506, it is judged whether or not the sheets number information of this virtual cassette reaches the initial sheets number at step S1507. If it is judged at step S1507 that the sheets number information does not reach the initial sheets number, the procedure returns to step S1501 to become a sheet feeding wait state.

If it is judged at step S1507 that the sheets number information is equal to the initial sheets number, the procedure goes to step S1508 to notify the paper out information through the output I/F portion 27 and the input I/F portion 12 of FIG. 2 from the mechanism simulation portion 2 to the software simulation portion 1. If step S1508 is ended, the "paper out" is displayed at step S1509 (1442, 1482 and 1403 in FIG. 17). If step S1509 is ended, the procedure is ended. If the procedure is ended here, the virtual sheets (fed sheets number or initial sheets number) within the virtual cassette are reset separately, and when the fed sheets information is not equal to the initial sheets number, this sequence is started again.

As described above, in this embodiment, the paper out state turns effective at the timing when the virtual sheet runs out, whereby the minute sheet conveyance simulation is enabled. Also, the sheet size and the sheets number can be set as the sheet information of the virtual cassette, whereby various simulations can be performed simply and the paper out state through the simulation can be implemented. Thereby, the inspection efficiency of farm software can be improved.

Embodiment 3

In an embodiment 3, the basic configuration is the same as in the embodiment 1. Hence, different points from the embodiment 1 are only described by quoting the contents of the embodiment 1. The explanation up to FIG. 4 is the same as in the embodiment 1, and omitted here.

Figure 19:
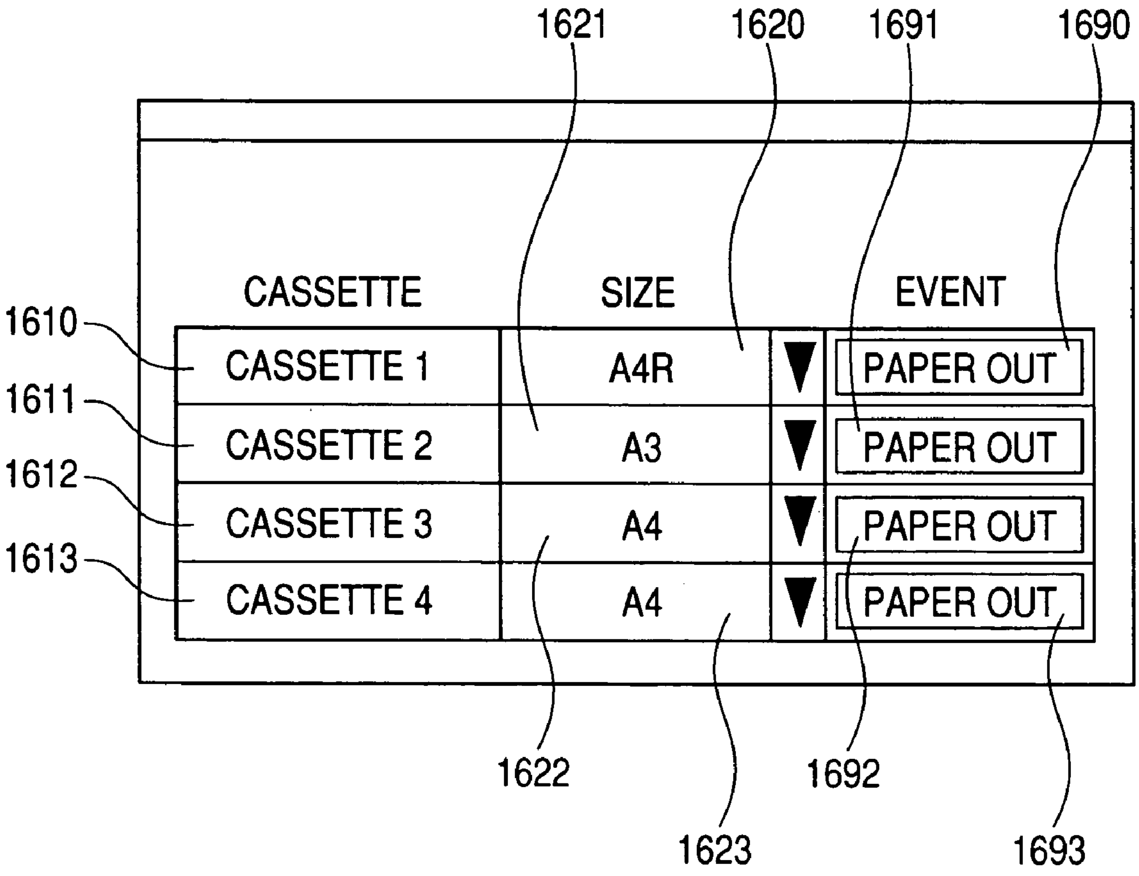
FIG. 19 is a diagram showing a cassette sheet window of an embodiment 3.

FIG. 19 is a screen of a cassette sheet window in this embodiment. Since the items 1600 to 1223 are equivalent to the items 500 to 523 in FIG. 5, other items will be described. Reference numerals 1690 to 1693 designate the paper out generation buttons. If this button is pressed, the paper out state is compulsorily generated in the corresponding virtual cassette.

Figure 20:
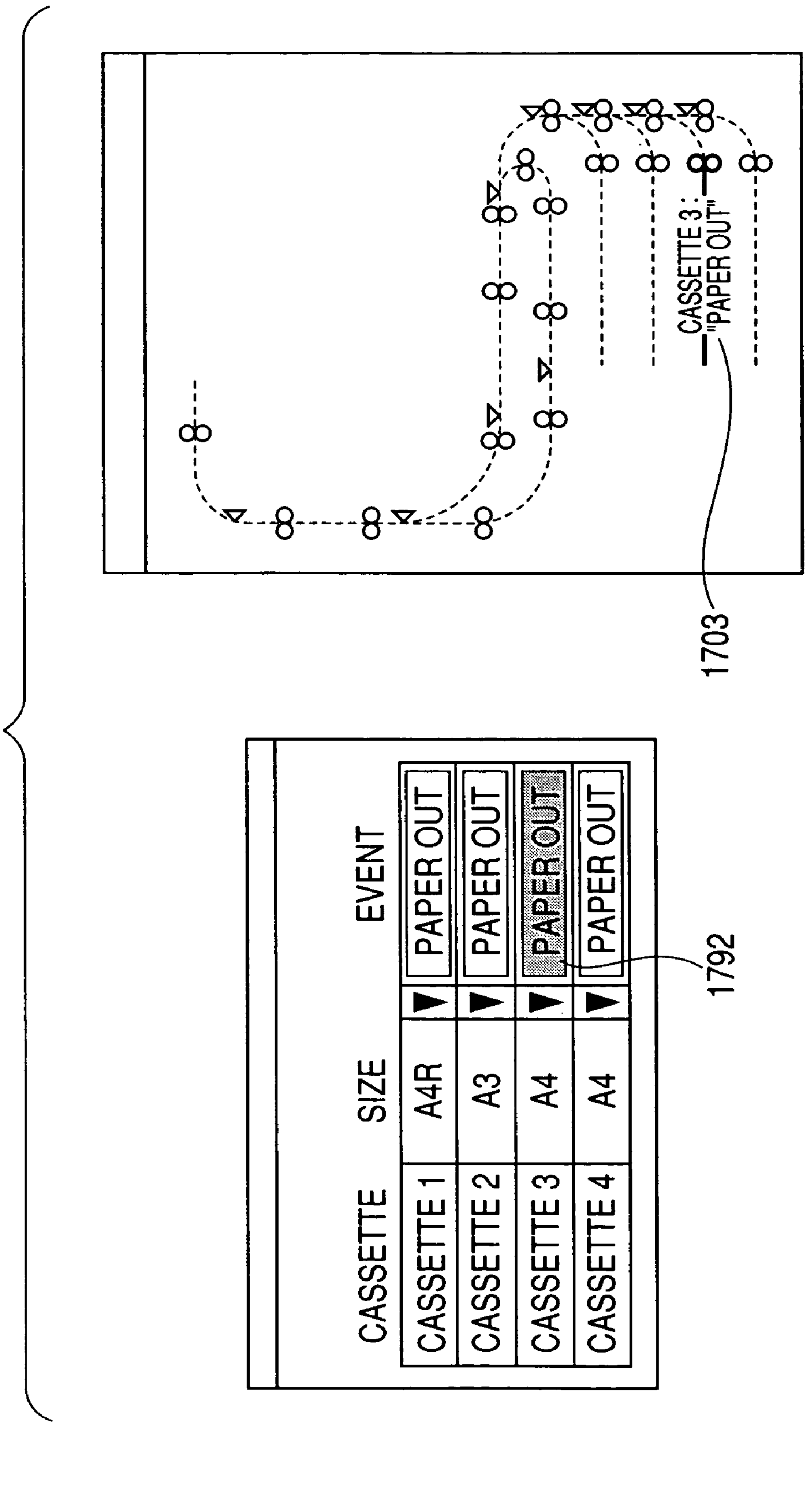
FIG. 20 is a diagram showing a display example for the paper out in the embodiment 3.

FIG. 20 is a display when a paper out generation button 1692 corresponding to the virtual cassette 3 is pressed in FIG. 19. The button is displayed in black and white reversal like 1792. Also, cassette 3: "paper out" is displayed corresponding to the virtual cassette 3 on the right sheet conveyance simulation screen, as indicated by 1703, and the virtual cassette and the virtual roller within the virtual cassette are emphasized in the bold line to be easily seen from the user.

Also, when this paper out occurs, a paper out state is notified from the output I/F portion 27 of the mechanism simulation portion 2 to the input I/F portion 12 of the software simulation portion 1 as shown in FIG. 2. Thereby, the paper out is recognizable from the farm software portion 10, which can perform a process for recognizing the paper out. In this situation, if the button 1792 is pressed once more, the black and white reversal display is returned to its original state, and the paper out indication in the right figure is also canceled. And the paper out cancel is notified from the output I/F portion 27 of the mechanism simulation portion 2 to the input I/F portion 12 of the software simulation portion 1 as shown in FIG. 2, and the original state is restored.

Also, in this embodiment, the sheet size can be changed by selection in the same way as in FIGS. 8A and 8B of the embodiment 1.

Figure 21:
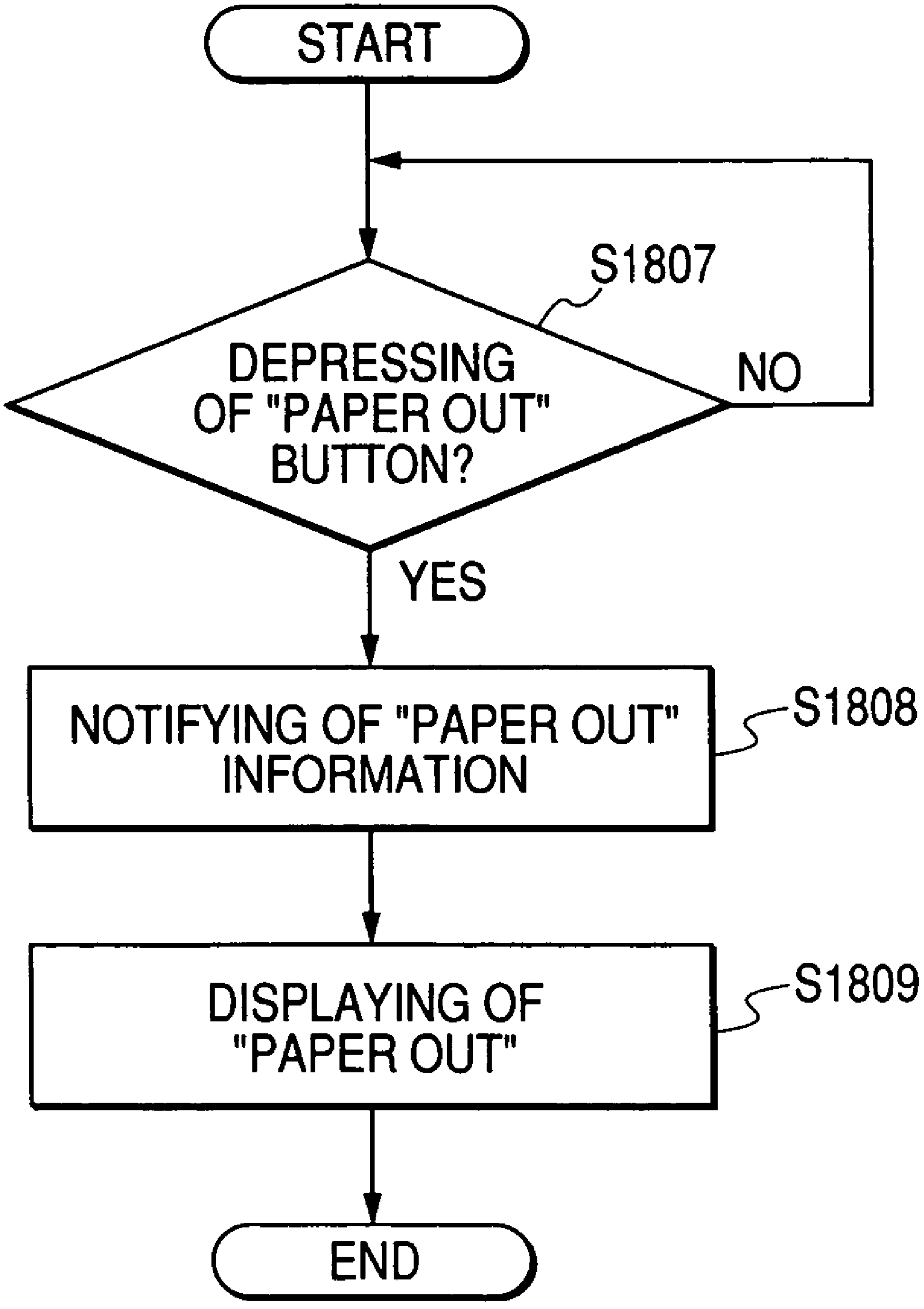
FIG. 21 is a flowchart showing a sequence of the embodiment 3.

FIG. 21 is a flowchart for explaining a sequence of this embodiment. This sequence involves a process of generating the paper out in the simulation, and rises when this simulator is started. Also, this sequence is provided for every virtual cassette, whereby the number of sequences is equal to the number of virtual cassettes.

First of all, at step S1807, it is judged whether or not the paper out button corresponding to the virtual cassette is pressed. If it is judged at step S1807 that the button is not pressed, step 1807 is repeated until the button is pressed. If it is judged at step S1807 that the paper out button is pressed, the paper out information is notified through the output I/F portion 27 and the input I/F portion 12 of FIG. 2 from the mechanism simulation portion 2 to the software simulation portion 1 at step S1808.

If step S1808 is ended, the "paper out" is displayed by the display control portion 5 at step S1809 (FIG. 20). After the end of step S1809, the procedure is ended. If the procedure is ended here, the paper out cancel is notified through the output I/F portion 27 of the mechanism simulation portion 2 and the input I/F portion 12 of the software simulation portion 1 to the farm software portion 10, when the button 1792 of FIG. 20 is pressed again. Moreover, the "paper out" indication as shown in FIG. 20 is canceled by the display control portion 5, and this sequence is started again.

As described above, in this embodiment, the paper out state can be generated by the input from the user, whereby the more minute sheet conveyance simulation is enabled than the conventional simulation in which the paper out is not generated.

Also, the paper out state can be generated at arbitrary timing and the paper out state can be displayed, whereby the inspection efficiency of the farm software controlling the sheet conveyance mechanism can be improved.

This application claims priority from Japanese Patent Application No. 2004-297706 filed Oct. 12, 2004, which is hereby incorporated by reference herein.

What is claimed is:

1. A computer-readable medium storing a design support computer program, which when executed on a computer, causes the computer to inspect a processing operation of software that controls a sheet conveyance mechanism by displaying the behavior of feeding a virtual sheet from a virtual sheet stock portion on a display portion, the computer program comprising:

a sheets number setting instruction for setting the sheets number of virtual sheets stored in said virtual sheet stock portion;

a sheet feed display instruction for displaying the behavior of feeding the virtual sheet from said virtual sheet stock portion on said display portion;

a stored sheets number subtraction instruction for subtracting the stored sheets number of virtual sheets corresponding to said virtual sheet stock portion to which the virtual sheet is supplied in said sheet feed display instruction;

a judgment instruction for judging whether or not the virtual sheet is used up in said virtual sheet stock portion where the stored sheets number of virtual sheets is subtracted in said stored sheets number subtraction instruction; and a paper out display instruction for displaying on said display portion the paper out on said virtual sheet stock portion for which it is judged that the virtual sheet is used up in said judgment instruction.

2. The computer-readable medium according to claim 1, further comprising a size setting instruction for setting the size information of the virtual sheet stored in said virtual sheet stock portion.

3. The computer-readable medium according to claim 2, wherein said sheet feed display instruction comprises displaying, on said display portion, the behavior of feeding the virtual sheet by changing the length of the virtual sheet in accordance with the size of the virtual sheet set by said size setting instruction.

4. The computer-readable medium according to claim 1, further comprising a sheet type setting instruction for setting the sheet type information of the virtual sheet stored in said virtual sheet stock portion.

5. The computer-readable medium according to claim 1, wherein said paper out display instruction comprises displaying, on said display portion, the paper out on said virtual sheet stock portion.

6. The computer-readable medium according to claim 1, further comprising a stored sheets number display instruction for displaying the stored sheets number of virtual sheets corresponding to said virtual sheet stock portion on said display portion every time the stored sheets number is subtracted in said stored sheets number subtraction instruction.

7. The computer-readable medium according to claim 1, further comprising a sheet feed number addition instruction for adding the sheet feed number of virtual sheets corresponding to said virtual sheet stock portion to which the virtual sheet is fed in said sheet feed display instruction.

8. The computer-readable medium according to claim 1, further comprising a sheet feed number display instruction for displaying on said display portion the sheet feed number of virtual sheets corresponding to said virtual sheet stock portion every time the sheet feed number is added in said sheet feed number addition instruction.

9. The computer-readable medium according to claim 1, further comprising a paper out state generation instruction for compulsorily generating a paper out state for said virtual sheet stock portion.

10. The computer-readable medium according to claim 1, wherein said paper out display instruction comprises displaying in bold-face type said virtual sheet stock portion for which it is judged that there is no virtual sheet in said judgement instruction on said display portion.

11. A design support method for inspecting a processing operation of software that controls a sheet conveyance mechanism by displaying the behavior of feeding a virtual sheet from a virtual sheet stock portion on a display portion, comprising:

a sheets number setting procedure of setting the sheets number of virtual sheets stored in said virtual sheet stock portion;

a sheet feed display procedure of displaying the behavior of feeding the virtual sheet from said virtual sheet stock portion on said display portion;

a stored sheets number subtraction procedure of subtracting the stored sheets number of virtual sheets corresponding to said virtual sheet stock portion to which the virtual sheet is supplied in said sheet feed display procedure;

a judgment procedure of judging whether or not the virtual sheet is used up in said virtual sheet stock portion where the stored sheets number of virtual sheets is subtracted in said stored sheets number subtraction procedure; and a display procedure of displaying on said display portion the paper out on said virtual sheet stock portion for which it is judged that the virtual sheet is used up in said judgement procedure.

12. The design support method according to claim 11, further comprising a size setting procedure of setting the size information of the virtual sheet stored in said virtual sheet stock portion.

13. The design support method according to claim 12, wherein said sheet feed display procedure comprises displaying, on said display portion, the behavior of feeding the virtual sheet by changing the length of the virtual sheet in accordance with the size of the virtual sheet set by said size setting procedure.

14. The design support method according to claim 11, further comprising a sheet type setting procedure of setting the sheet type information of the virtual sheet stored in said virtual sheet stock portion.

15. The design support method according to claim 11, wherein said paper out display procedure comprises displaying, on said display portion, the paper out on said virtual sheet stock portion.

16. The design support method according to claim 11, further comprising a stored sheets number display procedure of displaying the stored sheets number of virtual sheets corresponding to said virtual sheet stock portion on said display portion every time the stored sheets number is subtracted in said stored sheets number subtraction procedure.

17. The design support method according to claim 11, further comprising a sheet feed number addition procedure of adding the sheet feed number of virtual sheets corresponding to said virtual sheet stock portion to which the virtual sheet is fed in said sheet feed display procedure.

18. The design support method according to claim 11, further comprising a sheet feed number display procedure of displaying on said display portion the sheet feed number of virtual sheets corresponding to said virtual sheet stock portion every time the sheet feed number is added in said sheet feed number addition procedure.

19. The design support method according to claim 11, further comprising a paper out state generation procedure of compulsorily generating a paper out state for said virtual sheet stock portion.

20. The design support method according to claim 11, wherein said paper out display procedure comprises displaying in bold-face type said virtual sheet stock portion for which it is judged that there is no virtual sheet in said judgement procedure on said display portion.

* * * * *